United States Patent
Tsukagoshi (10) Patent No.: US 9,979,898 B2
(45) Date of Patent: May 22, 2018

(54) IMAGING APPARATUS EQUIPPED WITH A FLICKER DETECTION FUNCTION, FLICKER DETECTION METHOD, AND NON-TRANSITORY COMPUTER-READABLE STORAGE MEDIUM

(71) Applicant: CASIO COMPUTER CO., LTD., Shibuya-ku, Tokyo (JP)

(72) Inventor: Takeshi Tsukagoshi, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/245,762

(22) Filed: Aug. 24, 2016

(65) Prior Publication Data

US 2017/0142315 A1    May 18, 2017

(30) Foreign Application Priority Data

Nov. 12, 2015    (JP) ................................. 2015-222278

(51) Int. Cl.
| | | |
|---|---|---|
| *H04N 5/235* | (2006.01) | |
| *G06K 9/52* | (2006.01) | |
| *G06K 9/62* | (2006.01) | |
| *H04N 5/376* | (2011.01) | |

(52) U.S. Cl.
CPC ............. *H04N 5/2357* (2013.01); *G06K 9/52* (2013.01); *G06K 9/6215* (2013.01); *H04N 5/3765* (2013.01)

(58) Field of Classification Search
CPC ...... H04N 5/2354; H04N 5/225; H04N 9/045; H04N 21/4223; H04N 7/0127; G02B 21/008
See application file for complete search history.

(56) References Cited

U.S. PATENT DOCUMENTS

| | | | |
|---|---|---|---|
| 7,289,144 B2 | 10/2007 | Arazaki | |
| 2011/0205394 A1* | 8/2011 | Fuchigami | ........... H04N 5/2357 348/226.1 |

(Continued)

FOREIGN PATENT DOCUMENTS

| | | |
|---|---|---|
| JP | 2004007402 A | 1/2004 |
| JP | 2014027496 A | 2/2014 |
| JP | 2014165800 A | 9/2014 |

OTHER PUBLICATIONS

Japanese Office Action dated Sep. 21, 2017 issued in counterpart Japanese Application No. 2015-222278.

*Primary Examiner* — Trung Diep
(74) *Attorney, Agent, or Firm* — Holtz, Holtz & Volek PC (57) ABSTRACT

An imaging apparatus equipped with a flicker detection function and including an image sensor of a rolling shutter type calculates a Fourier spectrum including an amplitude and a phase for each of two captured images acquired by the image sensor and having different imaging timings by performing Fourier spectrum analysis based on a flicker period serving as a detection target, and judges that flicker with the flicker period serving as the detection target has occurred, when the amplitude of a calculated Fourier spectrum and the phases of the two Fourier spectrums satisfy predetermined conditions and a sum of squares of a pixel value difference between the two captured images for each pixel is larger than a predetermined sum of squares.

19 Claims, 3 Drawing Sheets

(56) References Cited

U.S. PATENT DOCUMENTS

| | | | | |
|---|---|---|---|---|
| 2012/0002074 A1* | 1/2012 | Baba | ............... | H04N 5/235 348/228.1 |
| 2012/0320232 A1* | 12/2012 | Trumbo | ............... | H04N 5/2357 348/226.1 |
| 2014/0375848 A1* | 12/2014 | Yamamoto | ........... | H04N 5/2355 348/241 |
| 2015/0146998 A1* | 5/2015 | Fuchigami | ........... | H04N 5/2357 382/275 |

* cited by examiner

FIG. 2

IMAGING APPARATUS EQUIPPED WITH A FLICKER DETECTION FUNCTION, FLICKER DETECTION METHOD, AND NON-TRANSITORY COMPUTER-READABLE STORAGE MEDIUM

CROSS-REFERENCE TO RELATED APPLICATION

This application is based upon and claims the benefit of priority from the prior Japanese Patent Application No. 2015-222278, filed Nov. 12, 2015, the entire contents of which are incorporated herein by reference.

BACKGROUND OF THE INVENTION

1. Field of the Invention

The present invention relates to an imaging apparatus which detects flicker based on brightness changes in captured images, and a corresponding flicker detection method and program stored in a non-transitory computer-readable storage medium.

2. Description of the Related Art

When an imaging apparatus such as a digital video camera captures images under an environment with a light source (for example, fluorescent tube) where brightness is periodically changed in accordance with a commercial power supply frequency (for example, 50 Hz or 60 Hz), the brightness of the light source changes with a period of $1/100$ seconds in a case where the commercial power supply frequency is 50 Hz or a period of $1/120$ seconds in a case where the commercial power supply frequency is 60 Hz, which may cause light and dark stripes in image signals. In this case, in an image sensor (CMOS: Complementary Metal-Oxide Semiconductor) of a rolling shutter type (line exposure sequential reading type), imaging for one frame is performed while exposure timing is shifted for each line. Therefore, a striped pattern may appear in a vertical direction on captured images, which causes flicker.

As a technique for detecting this flicker, a technique is conventionally known in which, when the presence or absence of a flicker occurrence factor such as a fluorescent lamp is to be detected in an imaging apparatus including an image sensor of a rolling shutter type, the occurrence status of stripes in captured images is analyzed to detect a frequency of flicker components of the fluorescent light (refer to Japanese Patent Application Laid-Open (Kokai) Publication No. 2004-007402).

SUMMARY OF THE INVENTION

In accordance with one aspect of the present invention, there is provided an imaging apparatus equipped with a flicker detection function, comprising: an imaging section which includes an image sensor of a rolling shutter type; and a control section which includes a processor, wherein the control section (i) calculates a Fourier spectrum including an amplitude and a phase for each of two captured images acquired by the image sensor of the rolling shutter type and having different imaging timings, by performing Fourier spectrum analysis based on a flicker period serving as a detection target, and (ii) judges that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

In accordance with another aspect of the present invention, there is provided a flicker detection method for an imaging apparatus equipped with an image sensor of a rolling shutter type, comprising: calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

In accordance with another aspect of the present invention, there is provided a non-transitory computer-readable storage medium having stored thereon a program that is executable by a computer of an imaging apparatus equipped with an image sensor of a rolling shutter type to actualize functions comprising: calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

In accordance with another aspect of the present invention, there is provided an imaging apparatus equipped with a flicker detection function, comprising: an imaging section which includes an image sensor of a rolling shutter type; and a control section which includes a processor, wherein the control section (i) calculates a Fourier spectrum including an amplitude and a phase for each of two captured images acquired by the image sensor of the rolling shutter type and having different imaging timings, by performing Fourier spectrum analysis based on a flicker period serving as a detection target, and (ii) judges that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

In accordance with another aspect of the present invention, there is provided a flicker detection method for an imaging apparatus equipped with an image sensor of a rolling shutter type, the method comprising: calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

In accordance with another aspect of the present invention, there is provided a non-transitory computer-readable storage medium having stored thereon a program that is executable by a computer of an imaging apparatus equipped with an image sensor of a rolling shutter type to actualize functions comprising: calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment of the present invention will hereinafter be described with reference to FIG. 1 to FIG. 3.

Figure 1:
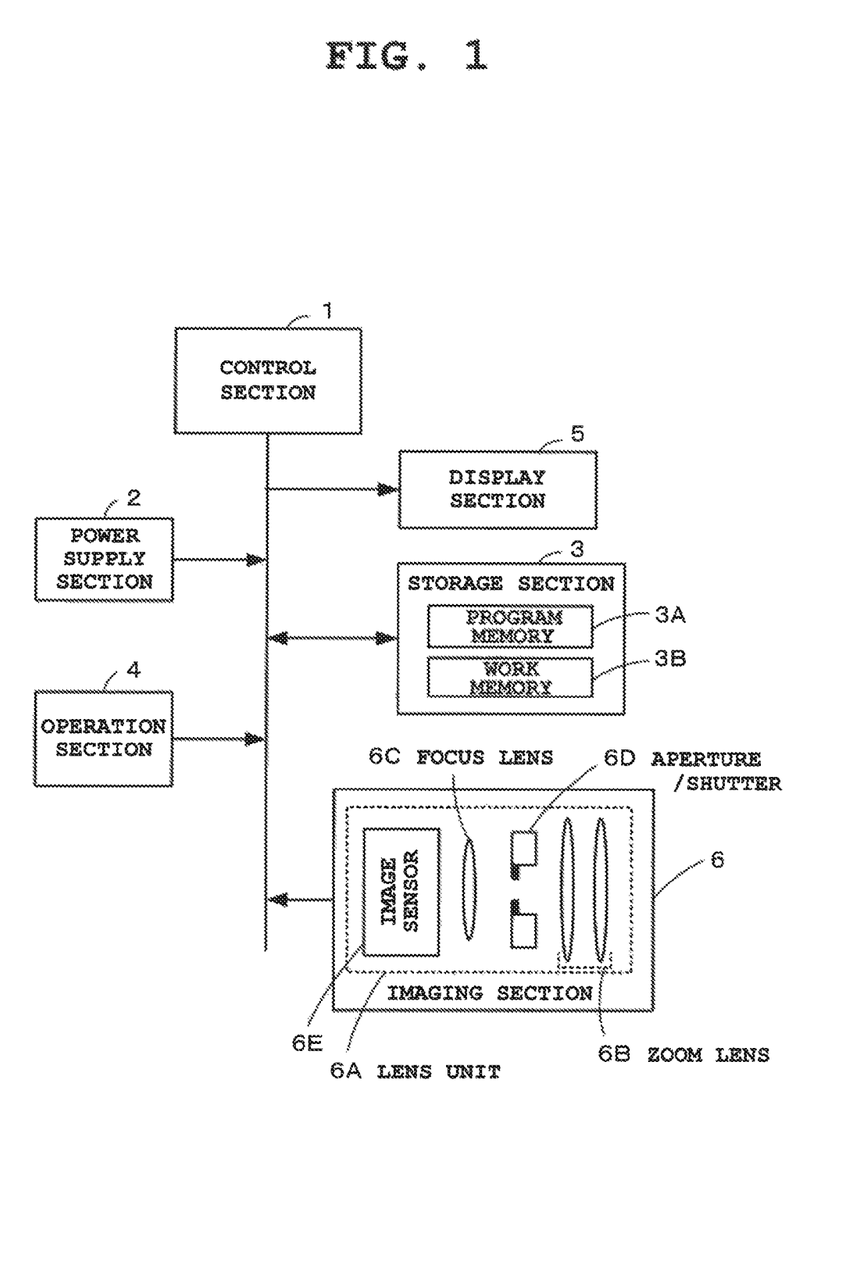
FIG. 1 is a block diagram showing basic components of a digital camera, in which the present invention has been applied as an imaging apparatus.

FIG. 1 is a block diagram showing basic components of a digital camera, in which the present invention has been applied as an imaging apparatus.

This imaging apparatus is a digital camera having a flicker detection function in addition to an imaging function for capturing still images and moving images, a replay function for displaying a recorded and stored image, a clock function for acquiring clock information, an automatic exposure function for acquiring exposure in accordance with the brightness of a photographic subject by automatic control of aperture and speed, and the like. This flicker detection function is a function for detecting the occurrence factor of flicker appearing in a captured image under an environment with a light source (for example, a fluorescent tube) where brightness is periodically changed in accordance with a commercial power supply frequency. A control section 1 in FIG. 1 operates by power supply from a power supply section (secondary battery) 2, and controls the entire operation of the digital camera by following various programs in a storage section 3. The control section 1 is provided with a CPU (Central Processing Unit), a memory, and the like not shown.

The storage section 3 is structured to include a ROM (Read Only Memory), a flash memory, and the like, and has a program memory 3A having stored thereon a program and various applications for achieving the present embodiment in accordance with an operation procedure depicted in FIG. 2 and FIG. 3 described below, a work memory 3B that temporarily stores various information (for example, a flag) required for the camera to operate, and the like. The storage section 3 may be structured to include a removable portable memory (recording medium) such as an SD (Secure Digital) card or a USB memory, or may be structured to include, although not shown, a storage area on a predetermined server apparatus side in a case where the camera is connected to a network by a communication function.

An operation section 4 in FIG. 1 includes, although omitted in the drawing, a mode change button for switching between an operation mode for image capturing (imaging mode) and an operation mode for replaying a captured image (stored image) (replay mode), and a release button for giving an instruction for starting image capturing, as well as various keys for setting imaging conditions such as, shutter speed, aperture, and ISO film speed. As processing in response to an input operation signal from the operation section 4, the control section 1 performs, for example, mode change processing, image capture processing, setting processing for imaging conditions, and the like. A display section 5 is a high-definition liquid-crystal display, organic EL (Electro Luminescence) display, or the like serving as a monitor screen (live view screen) for displaying data of captured images (live view image) in real time or a replay screen for replaying captured image data.

An imaging section 6 in FIG. 1 constitutes a camera section capable of photographing a subject with high definition, and has a lens unit 6A. The lens unit 6A is provided with a zoom lens 6B, a focus lens (in-focus lens) 6C, an aperture and shutter 6D, and an image sensor 6E. The image sensor 6B has pixels two-dimensionally arranged in a matrix, and is a CMOS (Complementary Metal Oxide Semiconductor) image sensor of a rolling shutter type (line exposure sequential reading type) that performs image capturing for the pixels arranged on horizontal lines (row lines) and vertical lines (column lines) by shifting exposure timing for each horizontal line (one line or several lines) aligned in a vertical direction.

The image sensor 6E has a charge accumulating section and a charge transfer section omitted in the drawing and, from its head line (a horizontal line on an uppermost-end (row)) to the last line (a horizontal line on a lowermost end (row)), sequentially performs exposure and reading for each horizontal line while shifting timing for each predetermined time. Note that, for convenience of explanation, "vertical" and "horizontal" herein refer to directions of reading pixel data when the above-described exposure is performed by the image sensor of the rolling shutter type, and are not limited to the gravity direction, the direction of mounting the image sensor, and the like. The horizontal line is hereinafter simply referred to as "line" in some cases.

An image signal (analog-value signal) read out from the image sensor 6E is converted into a digital signal (image signal) by an A/D converting section omitted in the drawing, subjected to predetermined image display processing, and then displayed as a live view image on the monitor of a display section 5 in real time. The control section 1 performs, in response to an operation on the release button (omitted in the drawing), predetermined image processing (such as development processing) on a captured image to generate a photographic image, performs image compression processing on it for conversion into a standard file format, and then stores and records it in the recording medium of the storage section 3.

In the imaging apparatus (digital camera) having the image sensor 6E of the rolling shutter type as described above, one of the following methods is generally used to detect flicker which occurs in moving-image capturing under an environment with a light source where brightness is periodically changed in accordance with a commercial power supply frequency (for example, 50 Hz or 60 Hz). One method takes advantage of the fact that the amount of stripes occurring in captured images due to flicker varies depending on the exposure time, in which an exposure time is controlled to detect flicker. In this method, stripes caused by flicker can be directly detected. Therefore, it is not required to distinguish whether stripes occurring in captured images are of a stripe pattern appearing due to a pattern drawn on a photographic subject, the subject arrangement status, or the like (stripes caused by the subject) or of a stripe pattern appearing due to flicker of a light source (stripes caused by flicker). However, there is a problem in that if appropriate exposure may not be maintained, and large flicker stripes may appear in captured images at the time of flicker detection.

Another method takes advantage of the fact that the phases of stripes occurring in captured images due to flicker are different for each imaging timing (frame period), in which imaging timing is controlled to distinguish whether stripes occurring in captured images are those caused by a photographic subject or those caused by flicker so as to detect flicker. In this method, when it is detected that stripes have occurred in two captured images and the phases of the stripes are different, a judgment is made that the stripes have occurred not by the photographic subject but by flicker. As a result of this configuration, stripes due to flicker in captured images can be decreased with appropriate exposure being maintained. However, in this method, imaging timing is required to be control such that whether stripes in captured images are caused by a photographic subject or flicker is distinguishable. Therefore, there is a problem in that flicker detection is difficult under an imaging situation where imaging timing is fixed, such as during moving-image capturing (or live view display).

That is, a period where stripes due to flicker appear in captured images is a period of the least common multiple of the flicker period and the period of imaging frames. If the period of imaging frames is an integral multiple of the flicker period, the period in which flicker stripes appear coincides with the period of imaging frames, and no flicker stripes appear. Therefore, for example, when the imaging frame rate is 30 fps (a period of 33 ms), 50 Hz flicker (flicker occurring due to a power supply frequency of 50 Hz) can be detected. By contrast, if the period of imaging frames is an integral multiple of the flicker period, for example, when the imaging frame rate is 30 fps (a period of 33 ms) to detect 60 Hz flicker (flicker occurring due to a power supply frequency of 60 Hz), a frame at any timing matches 60 Hz flicker in phase and no phase difference occurs between frames due to flicker, so that 60 Hz flicker is not detectable.

In the method of detecting flicker by controlling imaging timing as described above, the phase of stripes caused by flicker is intentionally shifted with respect to imaging timing (the imaging timing is controlled), and the phase of stripes caused by the photographic subject is intentionally not shifted with respect to the imaging timing (the frame rate is set such that image capturing is performed twice within a short period of time so that the amount of movement is small even if the subject is moving). As a result of this configuration, when it is detected that stripes have occurred in captured images and the phases of the stripes are different, a judgment is made that the stripes have appeared not due to the photographic subject but due to flicker. By contrast, in the present embodiment, whether stripes in captured images have occurred due to the photographic subject or flicker is distinguished by a reverse method, whereby flicker is detected.

That is, in the present embodiment, in reverse to the method described above, the phase of flicker is intentionally not shifted with respect to imaging timing (the frame rate (imaging timing) is fixed and set so as not to be shifted), and the phase of stripes caused by the photographic subject is intentionally shifted with respect to the imaging timing. That is, when image capturing is performed twice and the photographic subject and the imaging apparatus are judged to be relatively moving, these two captured images are used to detect the phases of stripes in those images. As a result, when it is detected that stripes have occurred in the captured images and the phases of the stripes are identical or similar to each other, a judgment is made that the stripes have occurred not due to the photographic subject but due to flicker. As a result of this configuration, even in an imaging situation where imaging timing is fixed, such as during moving-image capturing (or live view display), whether stripes in captured images have occurred due to the photographic subject or flicker can be distinguished to detect flicker.

Next, the operation concept of the digital camera in the present embodiment is described with reference to the flowchart depicted in FIG. 2 and FIG. 3. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. FIG. 2 and FIG. 3 show a flowchart outlining the operation of the characteristic portion of the present embodiment from among all of the operations of the imaging apparatus. After exiting this flow of FIG. 2 and FIG. 3, the control section 1 returns to the main flow (omitted in the drawing) of the overall operation.

Figure 2:
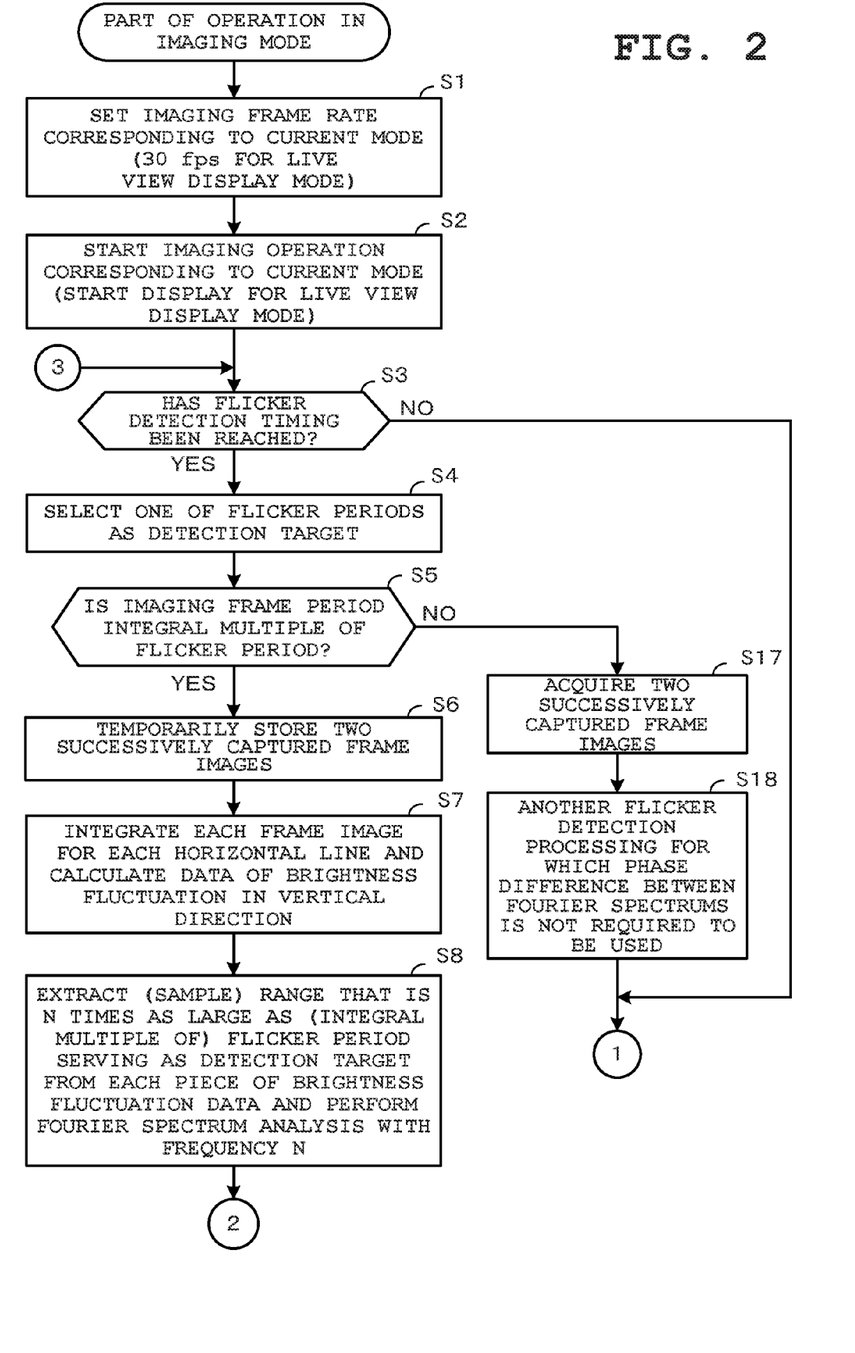
FIG. 2 is a flowchart for describing part of an operation (flicker detection operation, which is a feature of the present embodiment) in an imaging mode.
Figure 3:
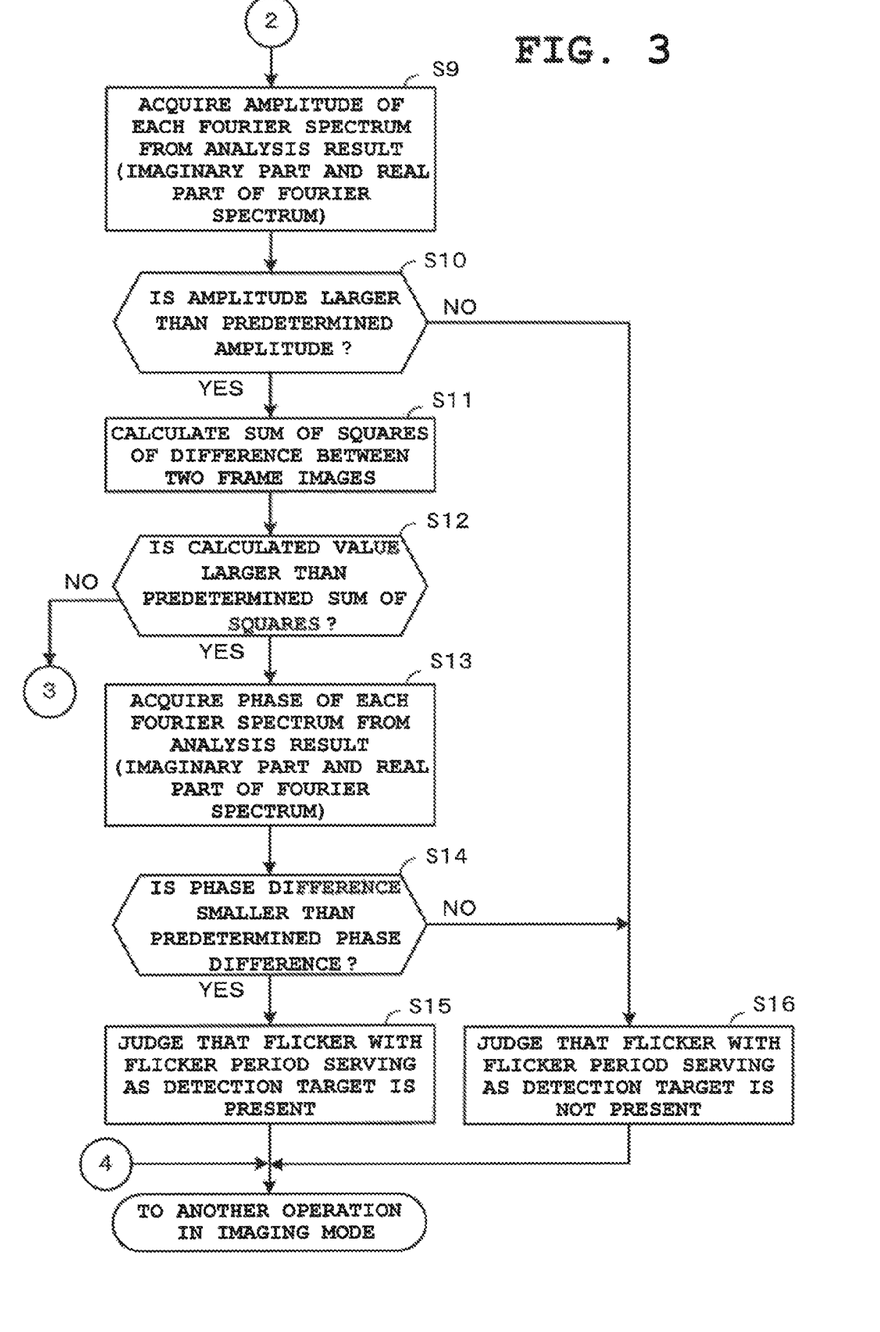
FIG. 3 is a flowchart following the operation of FIG. 2.

FIG. 2 and FIG. 3 show the flowchart for describing part of an operation (flicker detection operation, which is a feature of the present embodiment) in an imaging mode. This operation is performed at the time of, for example, moving-image capturing (or live view display).

First, the control section 1 sets an imaging frame rate corresponding to a current mode (arbitrary imaging mode selected from various moving-image capturing modes) (Step S1 of FIG. 2). When the current mode is an imaging mode for live view display, the control section 1 sets 30 fps as an imaging frame rate. Next, the control section 1 starts an imaging operation corresponding to the current mode and, when the current mode is an imaging mode for live view display, starts an operation of displaying captured images (Step S2).

In this state, the control section 1 judges whether flicker detection timing determined in advance has been reached (for example, a case where an imaging mode has been set at startup or a case where a current mode has been switched to an imaging mode from another mode) (Step S3). When judged that the detection timing has not been reached (NO at Step S3), the control section 1 proceeds to another operation in the imaging mode. When judged that the detection timing has been reached (YES at Step S3), the control section 1 selects, as a detection target this time, one of a flicker period of 50 Hz (10 ms) and a flicker period of 60 Hz (8.3 ms) which are possible detection targets (Step S4). Then, the control section 1 acquires the set frame rate (frame period) for moving-image capturing (or live view display) and judges whether this imaging frame rate is an integral multiple of the selected flicker frequency (Step S5).

For example, when 60 Hz flicker is selected as a detection target with the imaging frame rate being set at 30 fps, an imaging frame period of 33 ms is an integral multiple of the flicker period (8.3 ms). However, when 50 Hz flicker is selected as a detection target, the imaging frame period of 33 ms is not an integral multiple of the flicker period (10 ma). Also, when 60 Hz flicker is selected as a detection target with the imaging frame rate being set at 25 fps, an imaging frame period of 40 ms is not an integral multiple of the flicker period (8.3 ms). However, when 50 Hz flicker is selected as a detection target, the imaging frame period of 40 ms is an integral multiple of the flicker period (10 ms).

At Step S5, when 60 Hz flicker is selected as a detection target with the imaging frame rate being set at 30 fps, the imaging frame period is an integral multiple of the flicker period (YES at Step S5). Therefore, the control section 1 proceeds to flicker detection processing, which is a feature of the present embodiment (Steps S6 to S16). In this flicker detection processing, by Fourier spectrum analysis being performed on frame images captured at predetermined imaging timings based on the flicker period serving as a detection target, Fourier spectrums each including an amplitude and a phase are calculated, and then flicker with the flicker period serving as the detection target is judged to have occurred when the amplitude of the Fourier spectrum corresponding to the flicker period serving as the detection target is larger than a predetermined value, a phase difference between two Fourier spectrums is smaller than a predetermined value, and the photographic subject and the imaging apparatus are moving relatively. Note that flicker with the flicker period serving as the detection target may be judged to have occurred when the amplitude of the Fourier spectrum corresponding to the flicker period serving as the detection target is equal to or larger than a predetermined value, a phase difference between two Fourier spectrums is equal to or smaller than a predetermined value, and the photographic subject and the imaging apparatus are moving relatively.

First, the control section 1 specifies sequentially captured images for two frames as evaluation targets for flicker detection, acquires these frame images, and temporarily stores them in the work memory 3B (Step S6). Then, the control section 1 performs processing of reading out two frame images temporarily stored in the work memory 3B and integrating each of the image values of these frame images for each horizontal line to calculate brightness fluctuation data in the vertical direction (Step S7). That is, since stripes due to flicker appear in images in a vertical direction, the control section 1 takes one of temporally-sequential two frame images as a target, and integrates, for each horizontal line, all pieces of pixel data aligned in the horizontal direction in each horizontal line so as to acquire a plurality of integration values corresponding to the plurality of horizontal lines.

Next, the control section 1 takes the other frame image as a target, and similarly integrates, for each horizontal line, all pieces of pixel data aligned in the horizontal direction in each horizontal line so as to acquire a plurality of integration values corresponding to the plurality of horizontal lines. Then, the control section 1 compares, for each horizontal line, the plurality of integration values acquired by taking one frame image as a target and the plurality of integration values acquired by taking the other frame image as a target so as to calculate a plurality of comparison values (ratios in brightness for the respective lines) as brightness fluctuation data in the vertical direction. Note that the above-described integration and comparison may be performed for each line or for each plurality of lines. In addition, the integration may be performed for each line and the comparison may be performed for each plurality of lines. Furthermore, after the comparison is performed for each pixel, the comparison values may be integrated for each line.

Next, the control section 1 extracts (samples) a range that is N times as long as (an integral multiple of) the flicker period serving as the detection target from each piece of calculated brightness fluctuation data and performs Fourier spectrum analysis with a frequency N (Step S8). That is, the control section 1 specifies an evaluation area (image area) as a target for Fourier spectrum analysis, and extracts a plurality of pieces of corresponding comparison value data from this specified evaluation area (image area). In this case, brightness changes periodically appear in accordance with the flicker period. Therefore, when 50 Hz flicker is a detection target, the control section 1 extracts comparison value data from an image area (evaluation area) corresponding to a time equal to or longer than (preferably, an integral multiple equal to or larger than twice of) a period of 10 ms, which is of 50 Hz flicker. When 60 Hz flicker is a detection target, the control section 1 extracts comparison value data from an image area (evaluation area) corresponding to a time equal to or longer than (preferably, an integral multiple equal to or larger than twice of) a period of 8.3 ms, which is for 60 Hz flicker. Then, with the frequency N (N is an integer of 1, 2, 3, . . . ), the control section 1 performs Fourier spectrum analysis on brightness changes (brightness ratio fluctuation data) in the vertical direction of the comparison value data extracted from the evaluation area. In this case, when the entire evaluation area is taken as one period, the control section 1 analyzes what multiple of the period the contained frequency components correspond to.

By performing Fourier spectrum analysis on each of two frame images captured at predetermined imaging timings based on the flicker period serving as the detection target as described above, the control section 1 calculates Fourier spectrums each including an amplitude and a phase (an imaginary part and a real part). Then, the control section 1 proceeds to the flow of FIG. 3 and, from the result of the Fourier spectrum analysis on the two frame images (if the analysis result can be acquired in a form of a complex number including an imaginary part and a real part of a Fourier spectrum, the control section 1 transforms these imaginary part and real part into an amplitude and a phase of the Fourier spectrum based on a known transformation), the control section 1 acquires an amplitude of each Fourier spectrum (Step S9). Then, the control section 1 judges, for each frame image, whether the amplitude spectrum (the amplitude of the spectrum component of the frequency corresponding to the flicker serving as the detection target) is larger than a predetermined value (Step S10).

That is, the control section 1 judges whether the magnitude of the amplitude spectrum is larger than a predetermined value, that is, a threshold set in advance for judging whether stripes have appeared in captured images (this judgment may be made for one of the frame images, or may be made for both frame images by comparing one of a larger amplitude spectrum, a smaller amplitude spectrum, or an average amplitude spectrum with the threshold). Here, when the amplitude spectrum of any of the frame images is not larger than the predetermined value (NO at Step S10), the control section 1 judges that no stripes have appeared in the images, and judges that flicker with the flicker period serving as the detection target is not present (Step S16).

When the amplitude spectrum of any of the frame images is larger than the predetermined value (YES at Step S10), the control section 1 judges that stripes caused by the photographic subject or flicker have appeared in the captured images, and proceeds to Step S11 to read out the two frame images (the images for two frames used for Fourier spectrum analysis) temporarily stored in the work memory 3B and compare the pixel values of the frame images for each pixel to calculate the sum of squares of a difference therebetween. Then, based on whether this calculated value (amount of variations on the entire image) is larger than a predetermined value, the control section 1 judges whether the photographic subject and the imaging apparatus are relatively moving (Step S12).

Here, even when the amplitude spectrum is larger than the predetermined value and stripes are judged to have appeared in the images (YES at Step S10), if the sum of squares of a difference between the two frame images (differential sum of squares) is not larger than the predetermined value, that is, if the amount of variations on the entire image is small (NO at Step S12), relative movements (movement amount) of the photographic subject and the imaging apparatus are small, and therefore the control section 1 judges that the photographic subject and the imaging apparatus are not relatively moving. In this case, the control section 1 returns to Step S6 described above, specifies new two sequentially captured frame images as comparison targets (evaluation targets), acquires these frame images, and then repeats the above-described operation (Steps S6 to S12).

When the differential sum of squares is larger than the predetermined value (YES at Step S12), the control section 1 judges that the photographic subject and the imaging apparatus are relatively moving, and proceeds to the next Step S13, acquires a phase of each Fourier spectrum from the result (the imaginary part and the real part of the Fourier spectrum) of the Fourier spectrum analysis by using two frame images captured during the movement of the photographic subject. Next, the control section 1 judges whether a difference (absolute value) between the spectrum components (phase spectrums) of the frequency corresponding to the flicker period serving as the detection target is smaller than a predetermined value, that is, whether the difference is smaller than a threshold set in advance for judging whether stripes caused by flicker serving as a detection target are present (whether the phases are equal or similar to each other) (Step S14). In this case, since the frame period is an integral multiple of the flicker period, the positions of stripes caused by flicker are not changed. Therefore, based on whether the phase difference is smaller than the predetermined value, the control section 1 judges whether stripes caused by flicker serving as the detection target has appeared.

Here, when the difference (phase difference) in spectrum components (phase spectrum) of the frequency corresponding to the flicker cycle is not smaller than the predetermined value (NO at Step S14), since the positions of the stripes have changed (the stripes are not caused by flicker), the control section 1 judges that flicker with the flicker period serving as the detection target is not present (Step S16). However, when the phase difference is smaller than the predetermined value (YES at Step S14), the phases are identical or similar to each other, and therefore the control section 1 judges that an effect by flicker with the flicker period serving as the detection target is present (Step S15). That is, even when the absolute value of the phase difference between two Fourier spectrums corresponding to the frequency N is larger than the predetermined value, if the Fourier spectrums do not have a phase difference, the control section 1 judges that the cause of the amplitude of the Fourier spectrum corresponding to the frequency N being larger than the predetermined value is not the stripe pattern appearing due to a pattern drawn on the photographic subject, the subject arrangement status, or the like but flicker with the flicker period serving as the detection target. After this judgment, the control section 1 exits from the flow of FIG. 2 and FIG. 3.

On the other hand, when the imaging frame period is not an integral multiple of the selected flicker frequency, such as when 50 Hz flicker is selected as a detection target with the imaging frame rate being set at 30 fps (NO at Step S5), the control section 1 proceeds to Step S17, and acquires sequentially captured images for two frames as evaluation targets for flicker detection. Then, as another flicker detection processing on these two frame images which does not use a phase difference of Fourier spectrums, the control section 1 performs processing of detecting whether flicker with the flicker period serving as the detection target has occurred based on the amplitudes of the Fourier spectrums without using the phases of two Fourier spectrums or a judgment result as to relative movements of the photographic subject and the imaging apparatus (Step S18).

That is, one of the methods described above is used, such as the method of detecting flicker by controlling an exposure time by using the fact that the amount of stripes occurring in captured images due to flicker varies depending on the exposure time, and the method of intentionally shifting the phases of the stripes caused by flicker with respect to imaging timing (controlling imaging timing); intentionally not shifting the phases of the stripes caused by the photographic subject with respect to imaging timing (setting a frame rate such that image capturing is performed twice in a short period of time so as to decrease the amount of movement even if the photographic subject is moving); and judging, when stripes occur in captured images and the phases of the stripes are detected to be different, that the stripes have appeared not due to the photographic subject but due to flicker.

For example, the control section 1 integrates, for each horizontal line, each of image values of two frame images sequentially captured in a short period of time and having different phases of imaging timing with respect to a flicker period so as to calculate brightness fluctuation data in the vertical direction; takes a difference between the two calculated pieces of brightness fluctuation data; extracts (samples), from this differential data, a range that is N times as large as (an integral multiple of) the flicker period serving as a detection target; and performs Fourier spectrum analysis with the frequency N to acquire an amplitude of each Fourier spectrum. When the amplitude is not larger than a predetermined value, the control section 1 judges that flicker with the flicker period serving as the detection target is not present. When the amplitude is larger than the predetermined value, the control section 1 judges that stripes caused by flicker serving as the detection target have appeared. Then, the control section 1 exits from the flow of FIG. 2 and FIG. 3.

After ending the flicker detection processing as described above (after exiting from the flow of FIG. 2 and FIG. 3), the control section 1 proceeds to processing (omitted in the drawing) of changing imaging conditions (such as exposure time) based on the presence or absence of the occurrence of flicker detected in the flicker detection processing and the type of flicker (50 Hz flicker or 60 Hz flicker). For example, the exposure time (shutter speed) is changed to an integral multiple of the flicker period (10 ms or 8.3 ms) based on the type of detected flicker (50 Hz flicker or 60 Hz flicker). For example, the exposure time is changed to 10 ms, 20 ms, 30 ms, or the like under an environment of power supply of 50 Hz, and is changed to 8.3 ms, 16.7 ms, 25 ms, or the like under an environment of power supply of 60 Hz.

As described above, in the present embodiment, in the imaging apparatus including the image sensor of the rolling shutter type, Fourier spectrum analysis is performed for each of two captured images having different imaging timings, based on a flicker period serving as a detection target, and a Fourier spectrum including an amplitude and a phase is calculated. Then, when the amplitudes of the calculated Fourier spectrums and the phases of the two Fourier spectrums satisfy predetermined conditions, it is judged that flicker with the flicker period serving as the detection target has occurred. As a result of this configuration, even in an imaging situation where settings of special imaging conditions for flicker detection are restricted, it is possible to distinguish whether stripes occurred in captured images are caused by a photographic subject or flicker, so that flicker can be appropriately detected.

Also, the control section 1 judges that flicker with a flicker period serving as a detection target has occurred, when the amplitude of a Fourier spectrum corresponding to the flicker period serving as the detection target is larger than a predetermined value and a phase difference between two Fourier spectrums is smaller than a predetermined value. As a result of this configuration, if the phases of stripes appeared in two frame images are equal or similar to each other, it is possible to detect that the stripes are caused not by the photographic subject but by flicker serving as a detection target.

Also, the control section 1 detects that flicker with a flicker period serving as a detection target has occurred, when the amplitude of a Fourier spectrum corresponding to the flicker period serving as the detection target is larger than a predetermined value, a phase difference between two Fourier spectrums is smaller than a predetermined value, and the photographic subject and the imaging apparatus are judged to be relatively moving. As a result of this configuration, if the phases of stripes in two frame images captured when a photographic subject and the imaging apparatus are relatively moving are equal or similar to each other, it is possible to detect that the stripes are caused not by the photographic subject but by flicker serving as a detection target.

Moreover, Fourier spectrum analysis is performed for two frame images selected from a plurality of frame images sequentially captured with a predetermined imaging frame period. As a result of this configuration, flicker can be detected at the time of moving-image capturing.

Furthermore, when an imaging frame period is an integral multiple of a flicker period serving as a detection target, the control section 1 detects that flicker with the flicker period serving as the detection target has occurred, on condition that a phase difference between two Fourier spectrums is smaller than a predetermined value and the photographic subject and the imaging apparatus are judged to be relatively moving. As a result of this configuration, flicker can be appropriately detected even when an imaging frame period is an integral multiple of a flicker period serving as a detection target.

Still further, when an imaging frame period is not an integral multiple of a flicker period serving as a detection target, the control section 1 detects whether flicker with the flicker period serving as the detection target has occurred based on the amplitude of a Fourier spectrum, without using the phases of two Fourier spectrums or a judgment result as to whether the photographic subject and the imaging apparatus are relatively moving. As a result of this configuration, when an imaging frame period is not an integral multiple of a flicker period serving as a detection target, the presence or absence of flicker serving as the detection target can be detected from the amplitude of a Fourier spectrum. Accordingly, also when the frame rate is to be kept constant (for example, during moving-image capturing at 30 fps), both of 50 Hz flicker and 60 Hz flicker can be detected, and high-speed imaging can be actively performed.

Yet still further, the control section 1 takes two images with different imaging timings as targets, and compares the pixel values of these two images for each pixel to judge whether the photographic subject and the imaging apparatus are relatively moving. As a result of this configuration, from brightness changes on an entire image, relative movements of the photographic subject and the imaging apparatus can be accurately judged.

Yet still further, the control section 1 takes two images with different imaging timings as targets, and judges that the photographic subject and the imaging apparatus are relatively moving when the sum of squares of a pixel value difference between these two images for each pixel is larger than a predetermined value. As a result of this configuration, when the amount of variations of pixel values on an entire image is large, the photographic subject and the imaging apparatus can be judged to be relatively moving.

Yet still further, by image comparison using two frame images subjected to Fourier spectrum analysis, the control section 1 judges whether the photographic subject and the imaging apparatus are relatively moving. As a result of this configuration, Fourier spectrum analysis can be performed by using two frame images captured when the photographic subject and the imaging apparatus are relatively moving.

Yet still further, the control section 1 specifies two successive frame images from frame images captured at predetermined imaging timings and repeats an operation of sequentially specifying two successive frame images until a judgment that the photographic subject and the imaging apparatus are relatively moving is made by image comparison using two frame images. As a result of this configuration, flicker detection can be performed by using two frame images captured when the photographic subject and the imaging apparatus are relatively moving.

Yet still further, the control section 1 performs Fourier spectrum analysis with the frequency N by targeting an image area in which exposure timing in a captured frame image is within a time range that is N times (N is an integer) as large as a flicker period serving as a detection target. As a result of this configuration. Fourier spectrum analysis can be efficiently performed by targeting the data (data for analysis) of a range that is N times as long as a flicker period.

Yet still further, the control section 1 detects that flicker with a flicker period serving as a detection target has occurred when a judgment is made that the amplitude of a Fourier spectrum corresponding to the frequency N is larger than a predetermined value. As a result of this configuration, flicker periodically appearing in accordance with a flicker period serving as a detection target can be appropriately detected.

Yet still further, when an absolute value of a phase difference between two Fourier spectrums corresponding to the frequency N is smaller than a predetermined value after a judgment is made that the photographic subject and the imaging apparatus are relatively moving, the control section 1 detects that the cause for the amplitude of a Fourier spectrum corresponding to the frequency N becoming larger than the predetermined value is flicker with a flicker period serving as a detection target. As a result of this configuration, flicker can be appropriately detected even if flicker detection is performed based on an assumption that a photographic subject and the imaging apparatus are relatively moving.

Yet still further, when a detection target is 60 Hz flicker or 50 Hz flicker and an imaging frame rate is 30 fps or 25 fps, the control section 1 detects whether flicker with a flicker period serving as the detection target has occurred based on the phases of two Fourier spectrums and a judgment result as to whether the photographic subject and the imaging apparatus are relatively moving. As a result of this configuration, flicker can be appropriately detected even if an imaging frame period is an integral multiple of a flicker period serving as a detection target.

In the above-described embodiment, after Fourier spectrum analysis, two frame images used for this analysis are compared so as to judge whether the photographic subject and the imaging apparatus are relatively moving. However, a configuration may be adopted in which whether or not a photographic subject and the imaging apparatus are relatively moving is judged, and then Fourier spectrum analysis is performed by using two frame images used for this judgment.

Also, in the above-described embodiment, two sequentially captured images are compared to judge whether a photographic subject and the imaging apparatus are relatively moving. However, in place of the image sensor, a motion detection sensor (such as an acceleration sensor or Doppler sensor) may be used.

Also, when it is known (assumed) in advance that image capturing is performed not by the camera being fixed to a tripod or the like but by the camera being held by hand, since slight camera shake occurs, the processing at Steps S11 and S12 in the flowchart of FIG. 3 may be omitted.

Moreover, in the above-described embodiment, images for two frames are compared, and the sum of squares of a difference therebetween is calculated. Then, based on whether the differential sum of squares is larger than a predetermined value, whether the photographic subject and the imaging apparatus are relatively moving is judged. However, as a matter of course, the judgment method is not limited to this method of using the differential sum of squares.

Furthermore, in the judgment as to whether a photographic subject and the imaging apparatus are relatively moving, it may be judged whether they are relatively moving in a vertical direction in which stripes in an image occur.

Still further, in the above-described embodiment, when a judgment result is "NO" at Step S5 of FIG. 2, another flicker detection processing is performed to reduce the load of performing superfluous processing such as motion detection and phase analysis. However, a configuration may be adopted in which, even when a judgment result is "NO" at Step S5, the same flicker detection processing as that when the judgment result is "YES" is performed.

Yet still further, in the above-described embodiment, the present invention has been applied to a digital camera as an imaging apparatus. However, the present invention is not limited thereto, and may be applied to a camera-function-equipped personal computer, a PDA (Personal Digital Assistance), a tablet terminal device, a portable telephone such as a smartphone, an electronic game machine, a music player, and the like.

Yet still further, the "apparatuses" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An imaging apparatus equipped with a flicker detection function, the imaging apparatus comprising:
   an imaging section which includes an image sensor of a rolling shutter type; and
   a control section which includes a processor,
   wherein the control section (i) calculates a Fourier spectrum including an amplitude and a phase for each of two captured images acquired by the image sensor of the rolling shutter type and having different imaging timings, by performing Fourier spectrum analysis based on a flicker period serving as a detection target, and (ii) judges that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

2. The imaging apparatus according to claim 1, wherein the control section judges that the predetermined conditions are satisfied when an amplitude of at least one of the two Fourier spectrums corresponding to the flicker period serving as the detection target is larger than a predetermined amplitude and a phase difference between the two Fourier spectrums is smaller than a predetermined phase difference.

3. The imaging apparatus according to claim 1, wherein the control section (i) judges whether a photographic subject and a body of the imaging apparatus are relatively moving, and (ii) judges that flicker with the flicker period serving as the detection target has occurred, when an amplitude of at least one of the two Fourier spectrums corresponding to the flicker period serving as the detection target is larger than a predetermined amplitude, a phase difference between the two Fourier spectrums is smaller than a predetermined phase difference, and the photographic subject and the body of the imaging apparatus are judged to be relatively moving.

4. The imaging apparatus according to claim 1, wherein the imaging section sequentially captures images with a predetermined imaging frame period, and
   wherein the control section performs the Fourier spectrum analysis on two frame images selected from a plurality of frame images sequentially captured with the predetermined imaging frame period.

5. The imaging apparatus according to claim 4, wherein the control section, when the predetermined imaging frame period is an integral multiple of the flicker period serving as the detection target, detects that flicker with the flicker period serving as the detection target has occurred, on condition that a phase difference between the two Fourier spectrums is smaller than a predetermined phase difference and a photographic subject and a body of the imaging apparatus are judged to be relatively moving.

6. The imaging apparatus according to claim 4, wherein the control section detects, when the predetermined imaging frame period is not an integral multiple of the flicker period serving as the detection period, whether flicker with the flicker period serving as the detection target has occurred based on the amplitude of the at least one of the two Fourier spectrums, without using the phases of the two Fourier spectrums or a result of a judgment as to whether a photographic subject and a body of the imaging apparatus are relatively moving.

7. The imaging apparatus according to claim 4, wherein the control section takes two frame images having different imaging timings as targets, and judges whether a photographic subject and a body of the imaging apparatus are relatively moving by comparing pixel values of the two frame images for each pixel.

8. The imaging apparatus according to claim 7, wherein the control section takes the two frame images having the different imaging timings as the targets, and judges that the photographic subject and the body of the imaging apparatus are relatively moving when a sum of squares of a pixel value difference between the two frame images for each pixel is larger than the predetermined sum of squares.

9. The imaging apparatus according to claim 7, wherein the control section judges whether the photographic subject and the body of the imaging apparatus are relatively moving by image comparison using the two frame images subjected to the Fourier spectrum analysis.

10. The imaging apparatus according to claim 7, wherein the controls section specifies two successive frame images from among frame images captured at predetermined imaging timings and repeats an operation of sequentially specifying two successive frame images until a judgment that the photographic subject and the body of the imaging apparatus are relatively moving is made by image comparison using the two frame images.

11. The imaging apparatus according to claim 4, wherein the control section performs the Fourier spectrum analysis with a frequency N (where N is an integer) that is a frequency that is N times as large as the flicker period serving as the detection target, by targeting an image area in which an exposure timing in a frame image is within a time range that is N times as large as the flicker period serving as the detection target.

12. The imaging apparatus according to claim 11, wherein the control section detects that flicker with the flicker period serving as the detection target has occurred, when a judgment is made that an amplitude of a Fourier spectrum corresponding to the frequency N is larger than a predetermined amplitude.

13. The imaging apparatus according to claim 11, wherein the control section detects that, when an absolute value of a phase difference between two Fourier spectrums corresponding to the frequency N is smaller than a predetermined phase difference after a judgement is made that a photographic subject and a body of the imaging apparatus are relatively moving, a cause for an amplitude of at least one of the two Fourier spectrums corresponding to the frequency N becoming larger than a predetermined amplitude is flicker with the flicker period serving as the detection target.

14. The imaging apparatus according to claim 1, wherein the control section detects whether flicker with the flicker period serving as the detection target has occurred based on the phases of the two Fourier spectrums and a result of a judgment as to whether a photographic subject and a body of the imaging apparatus are relatively moving, when the detection target is 60 Hz flicker or 50 Hz flicker and an imaging frame rate is 30 fps or 25 fps.

15. A flicker detection method for an imaging apparatus equipped with an image sensor of a rolling shutter type, the method comprising:
  calculating a Fourier spectrum including an amplitude and a phase for each of two captured images acquired by the image sensor of the rolling shutter type and having different imaging timings, by performing Fourier spectrum analysis based on a flicker period serving as a detection target, and
  judging that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

16. A non-transitory computer-readable storage medium having stored thereon a program that is executable by a computer of an imaging apparatus equipped with an image sensor of a rolling shutter type to actualize functions comprising:
  calculating a Fourier spectrum including an amplitude and a phase for each of two captured images acquired by the image sensor of the rolling shutter type and having different imaging timings, by performing Fourier spectrum analysis based on a flicker period serving as a detection target, and
  judging that flicker with the flicker period serving as the detection target has occurred, when an amplitude of at least one of two calculated Fourier spectrums and phases of the two Fourier spectrums satisfy predetermined conditions and a sum of squares of a pixel value difference between the two captured images for each pixel is larger than a predetermined sum of squares.

17. An imaging apparatus equipped with a flicker detection function, the imaging apparatus comprising:
  an imaging section which includes an image sensor of a rolling shutter type; and
  a control section which includes a processor,
  wherein the control section (i) calculates a Fourier spectrum including an amplitude and a phase for each of two captured images acquired by the image sensor of the rolling shutter type and having different imaging timings, by performing Fourier spectrum analysis based on a flicker period serving as a detection target, and (ii) judges that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

18. A flicker detection method for an imaging apparatus equipped with an image sensor of a rolling shutter type, the method comprising:

calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

19. A non-transitory computer-readable storage medium having stored thereon a program that is executable by a computer of an imaging apparatus equipped with an image sensor of a rolling shutter type to actualize functions comprising:

calculating a Fourier spectrum including an amplitude and a phase for each of two captured images acquired by the image sensor of the rolling shutter type and having different imaging timings, by performing Fourier spectrum analysis based on a flicker period serving as a detection target, and judging that flicker with the flicker period serving as the detection target has occurred, when an amplitude of at least one of two calculated Fourier spectrums corresponding to a frequency N (where N is an integer) that is a frequency that is N times as large as the flicker period serving as the detection target is larger than a predetermined amplitude and an absolute value of a phase difference between the two Fourier spectrums corresponding to the frequency N is smaller than a predetermined phase difference.

* * * * *